Nov. 15, 1966    E. H. E. MARTIN ETAL    3,285,003
INFLATABLE STRUCTURE

Filed Jan. 26, 1965    4 Sheets-Sheet 1

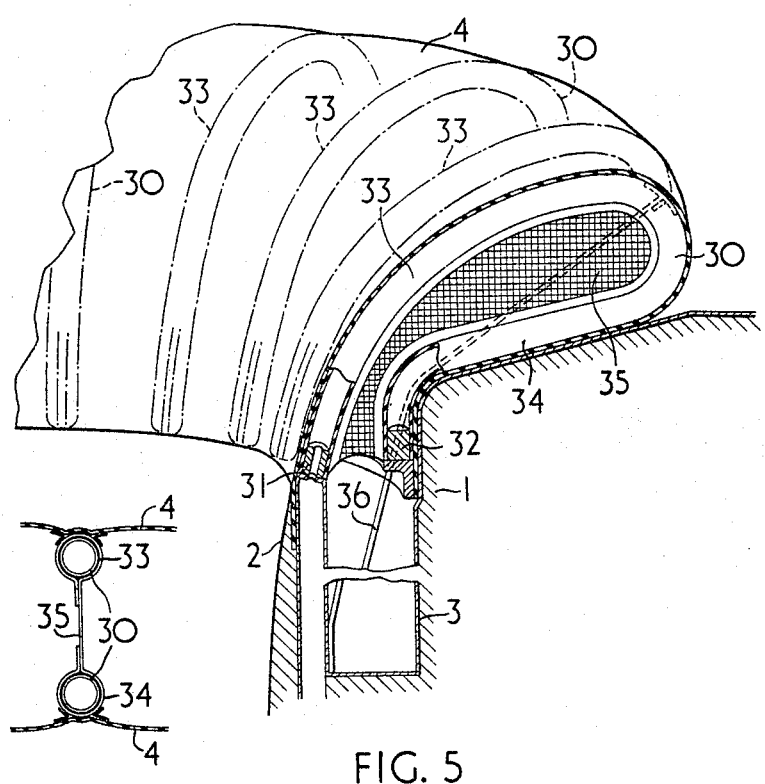

3,285,003
INFLATABLE STRUCTURE
Erwin Herbert Erhard Martin, Coventry, Richard Noel Thomson, Markfield, near Leicester, and Donald Norbury, Birmingham, England, assignors to Dunlop Rubber Company, Limited, Erdington, England, a corporation of Great Britain
Filed Jan. 26, 1965, Ser. No. 428,170
Claims priority, application Great Britain, Feb. 1, 1964, 4,366/64
17 Claims. (Cl. 138—45)

This invention relates to inflatable structures, and particularly to inflatable intakes for aircraft engines.

In certain applications it is desirable to provide means for temporarily modifying the shape of the intake orifice of an engine of an aircraft. One such application occurs in the use of a vertically disposed jet engine to provide lift for vertical take-off.

A "lift" engine may be mounted in the fuselage in such a position that, if maximum efficiency is to be achieved, the flared intake of the engine would need to project above the surface of the fuselage. This would be undesirable during forward flight of the aircraft owing to the additional air resistance produced by the intake. It is therefore desirable to provide an intake which can be collapsed into the fuselage when the lift engine is not in use. An inflatable device in accordance with the present invention would meet this requirement.

The object of the present invention is to provide an inflatable device which will, in the inflated state, form an intake of a required shape and will be sufficiently rigid to maintain substantially this shape under the wind pressures encountered in service.

According to the invention, an inflatable device comprises an inflatable envelope in combination with an expansible supporting structure.

The expansible supporting structure is preferably inflatable and also located within the envelope.

According to the invention also, a device which is inflatable to form an intake for an aircraft engine comprises an inflatable envelope and an inflatable supporting structure within the envelope.

The supporting structure may be in the form of an elastomeric tube or tubes, reinforced by textile material and separately inflatable to a higher pressure than the envelope. Alternatively, pairs of rigid telescoping tubes, or bellows, which are extensible by inflation may be used to produce a supporting structure.

Three embodiments of the invention will now be described, by way of example, with reference to the accompanying drawings, in which:

FIGURE 5 is a similar view to FIGURE 1 showing a further alternative intake in the inflated state of the components thereof; and, FIGURE 6 is a detail cross-sectional view showing part of the supporting structure of the intake shown in FIGURE 5.

In all three of the embodiments to be described the portion of an aircraft fuselage 1 adjacent an opening 2 through which air will pass to a vertically mounted "lift" jet engine is formed with a continuous recess 3 surrounding the opening to which the inflatable device is secured. The inflatable device comprises, in each case, an envelope 4 secured to the fuselage and inflatable through a suitable inlet pipe to form a flared intake which projects above the surface of the fuselage. The main differences in the three embodiments reside in the inflatable supporting structures provided within the envelopes.

Figure 1:
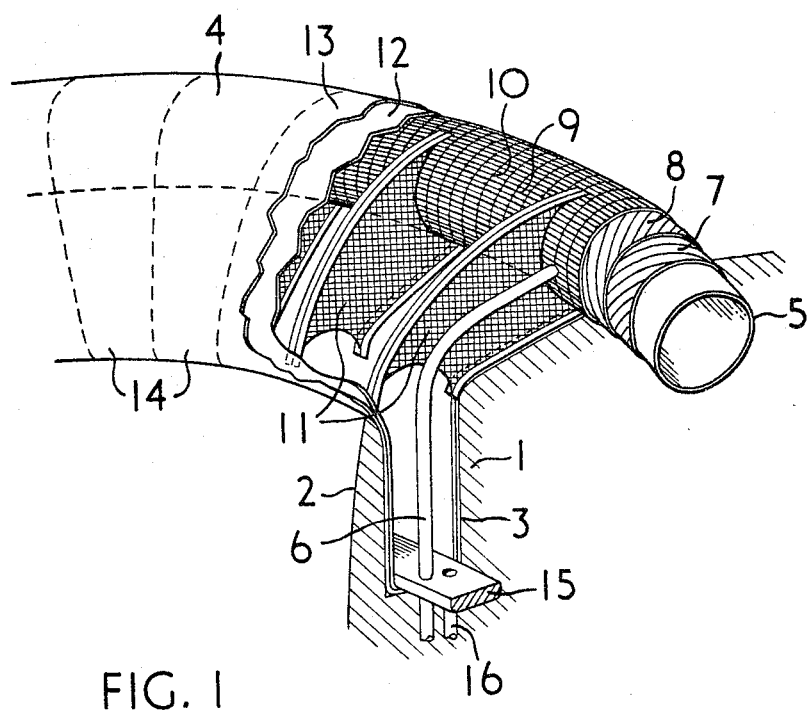
FIGURE 1 is a diagrammatic cutaway perspective view of part of an intake for an aircraft jet engine, the components of the intake being shown in the inflated state.
Figure 2:
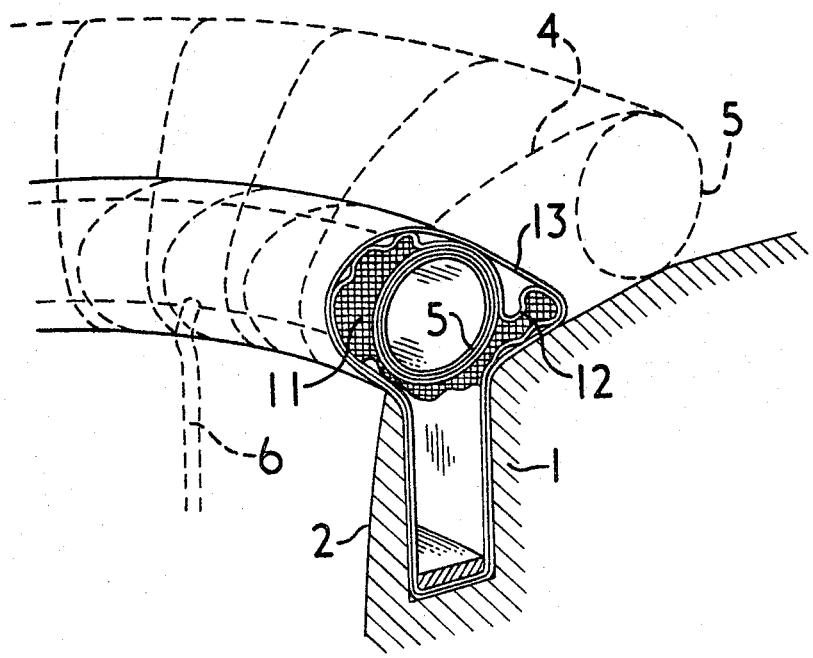
FIGURE 2 is a diagrammatic cutaway perspective view of part of the intake shown in FIGURE 1, showing the deflated state of components of the intake.

In the first embodiment, as shown in FIGURES 1 and 2, the supporting structure consists of a toroidal tube 5 of elastomeric material which is connected to an air pressure inlet via a flexible pipe 6, and which in the deflated state of the tube lies adjacent the continuous recess 3 surrounding the opening 2 in the fuselage (see FIGURE 2). The elastomeric tube 5 is reinforced by two plies 7 and 8 of parallel-cord fabric adhesively secured to the tube and arranged so that the cords of each ply are disposed at a bias angle of 78° (the bias angle is the angle made by a cord with a circumferential line of the toroid). The plies are wrapped around the tube so that the cords of the respective plies are disposed at equal and opposite bias angles.

The effect of the high bias angle of the cords forming the reinforcement of the tube 5 is that when the internal pressure in the tube is increased the tube tends to extend longitudinally, thus increasing the circumference of the toroid while the cross-sectional diameter of the tube itself remains substantially constant. This property is utilised in the present construction to provide means for moving the tube outwardly from its stowed position adjacent the recess 3 (see FIGURE 2) to its operative position in which it helps to support the inflated envelope of the intake and to provide sufficient stiffness in the leading edge thereof to resist wind pressure exerted during forward motion of the aircraft. The inflated diameter of the tube 5 is limited to a predetermined value by the provision of substantially inextensible circumferentially-extending cords 9 which are interlaced in a supporting net 10 which is adhesively secured to the outer surface of a reinforcing ply 8.

When the tube 5 is inflated the bias angle of the cords changes, and is reduced as the circumference of the toroid increases. If inflation were allowed to continue until a bias angle of 54° 44' was obtained the tube would become dimensionally stable and the radial expansion of the toroid would then cease. This provides an alternative means for ensuring that the inflated intake always has the same external diameter, but in the present examples it is preferred to use the circumferentially-extending cords 9 which provide a more positive stop.

The contour of the inflated intake is partly governed by inextensible fabric webs 11 which are secured at their edges to opposite inner surfaces of the envelope 4. The envelope 4 comprises an inner skin 12 of gastight textile fabric which is contained within, but not adhesively secured to, an outer skin 13 of rubber. Both skins are built up from a series of narrow segmental panels 14, and are secured to the base of the recess 3 by a ring 15 bolted to the base of the recess. An inlet pipe 16 is provided to enable the envelope to be inflated or deflated.

When inflated the curvature of the outer edge of the intake is governed by the radius of curvature of the toroidal tube, which, together with the fabric webs 11, holds the envelope in the required flared shape. The surface of the intake leading towards the engine has a smoothed curved contour produced by the internal pressure within the envelope and is tailored to suit aerodynamic requirements by selection of the required dimensions for the webs 11.

The dimensions of the rubber outer skin 13 are such that when the intake is fully inflated the skin 13 is under tension. On release of inflation pressure, the tube 5 returns to a smaller toroidal diameter and the tension in the skin 13 serves to draw the fabric layers into the retracted state as shown in FIGURE 2. If necessary, retraction of the tube 5 or of the envelope 4 or both can be assisted by the application of vacuum to exhaust the air from the pipes 6 and 16.

In operation, the intake is covered in its deflated state by a sliding lid (not shown) which is withdrawn when the engine is required for use in take-off. The envelope of the intake is then inflated to a pressure of about 5 pounds per square inch and the tube 5 is inflated to about 30 pounds per square inch to erect the intake as shown in FIGURE 1. As soon as the aircraft has achieved sufficient forward speed to render the "lift" engine unnecessary this engine is stopped and the intake is deflated to enable the lid to slide over the opening 2.

In an alternative construction, the envelope may comprise an inner layer of rubber adhesively secured within an outer layer of gastight fabric material.

Figures 3, 4:
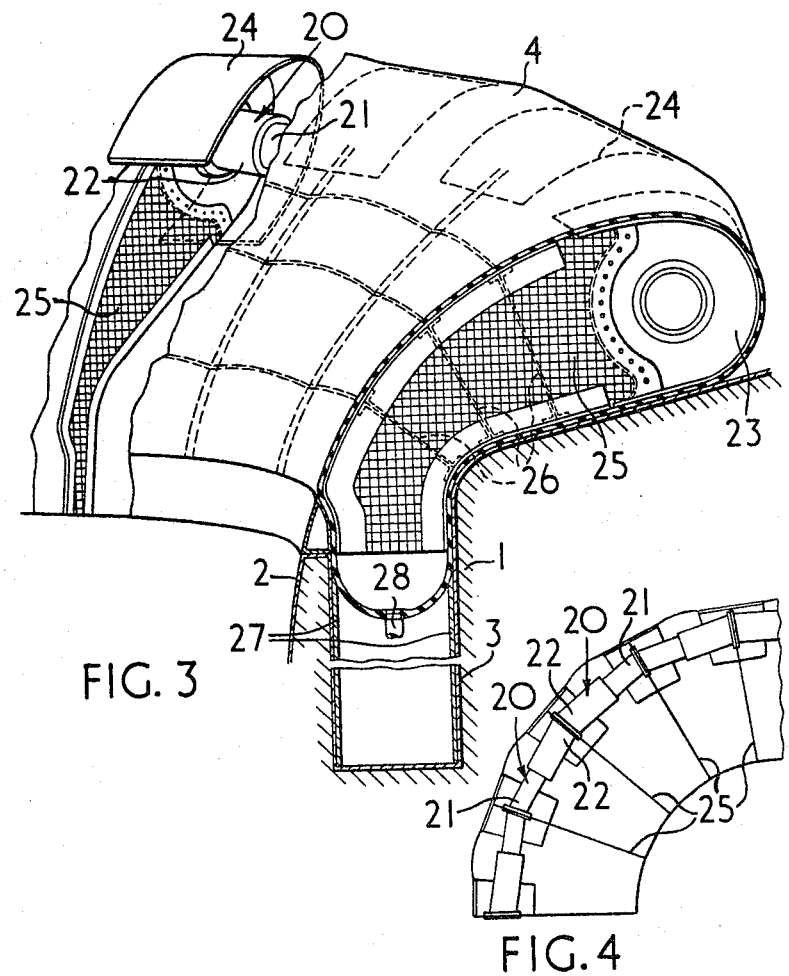
FIGURE 3 is a similar view to FIGURE 1 showing an alternative intake in the inflated state of the components.
FIGURE 4 is a diagrammatic plan view of part of the intake shown in FIGURE 3, in the inflated state.

In the second embodiment, as shown in FIGURES 3 and 4, the inflatable toroidal tube 5 is replaced by a series of expansible members 20 in the form of pairs of telescoping metal tubes 21, 22, connected to one another end-to-end to form a continuous ring and provided with an inlet (not shown) for air pressure to enable the ring to be inflated and thus expanded in diameter in a similar manner to the toroidal tube 5 described above. Return springs (not shown) are provided within the expansible members 20 to collapse the members on deflation. At the points of junction between adjacent expansible members rigid flat templates 23 are attached to the ring and arranged with their planes disposed in radial directions with respect to the inflated intake. Curved plates 24 are secured at right angles to the outer edges of the templates 23, the plates 24 following the template contours to provide rigid supports for the envelope 4. When inflated the ring of expansible members forms a rigid polygonal framework within the intake. The curved plates attached to the templates form segments which have the required intake nose surface contour and these plates support the envelope. The envelope 4 is made from gas-tight fabric and is inflatable as in the previous embodiment. Radially-disposed inextensible fabric webs 25 are secured at their edges to opposite inner surfaces of the envelope 4, the diaphragms being configured to impose the required contour of the envelope in the inflated condition thereof.

Within the envelope 4, a number of circumferentially-extending diaphragms 26 formed from elastomeric material of low elastic modulus are stretched between opposite inner surfaces of the envelope. The function of these circumferentially-extending diaphragms is to initiate folding of the envelope in concertina fashion when the internal pressure is reduced. The envelope 4 is secured in the recess 3 by fabric strips 27 which are bonded to the envelope and fastened to the side of the recess. A flexible tube 28 is provided to connect the envelope to a source of inflation pressure.

Retraction of the device into the recess is achieved by:

(1) Reducing the air pressure in the envelope until the stretched diaphragms 26 initiate circumferential quilting of the skin.

(2) Releasing air pressure from the telescopic tubes 21, 22, thus causing an initial reduction in the outside diameter of the supporting ring, and simultaneously applying vacuum to the interior of the envelope.

(3) Applying vacuum to the telescopic tubes to reduce the outside diameter of the ring to a sufficient extent to enable it to be stowed in or adjacent to the recess.

The dimensions of the tubes 21, 22 are preferably chosen so that the ring diameter when fully contracted is such that the curved plates 24 are drawn back to lie over the recess 3.

As in the first embodiment, retraction may also be assisted by employing radially-extensible fabric or a rubber skin in the envelope.

In an alternative construction the expansible members may be in the form of bellows.

In the third embodiment, as shown in FIGURES 5 and 6, the supporting structure, in its inflated state, consists of a series of radially-extending fabric-reinforced elastomeric tubes 30, each bent into a U-shape, the two ends 31 and 32 of each tube being anchored adjacent to the recess 3. The end 31 of each tube is connected to an air inlet and the other end 32 is sealed. The outer limbs 33 of the tubes 30 form a support for the flared envelope 4, which consists of an inflatable skin of gas-tight fabric, and the inner limbs 34 are supported by the fuselage. Each U-shaped tube is provided with a fabric web 35 which extends between the two limbs of the tube and is tailored to cause the inflated tube to assume a predetermined contour. The envelope is secured to the U-shaped tubes as shown in FIGURE 6 to hold the tubes in their required positions around the circumference of the intake, and is air-tightly secured to the sides of the recess, which is connected to a source of inflation pressure.

In order to provide for retraction of the device into a position adjacent the recess 3 upon deflation of the U-shaped tubes and the envelope 4, a series of rubber cords 36, only one of which is shown, are stretched (in the inflated state of the device) between the radially-outermost points of the envelope and the base of the recess 3. Provision may also be made for applying vacuum to the interior of the envelope or the tubes 30 or both. The rubber cords may extend radially, or alternatively may extend at an angle to the radial direction to cause the U-shaped tubes to collapse in a rotational manner and overlap one another in the recess. Although the present invention has been illustrated and described in connection with a few selected example embodiments, it will be understood that these are illustrative of the invention and are by no means restrictive thereof. It is reasonably to be expected that those skilled in the art can make numerous revisions and adaptations of the present invention and it is intended that such revisions and adaptations will be included within the scope of the following claims as equivalents of the invention.

Having now described our invention—what we claim is:

1. An inflatable device for defining the intake contour surrounding an opening or the like, comprising: an inflatable envelope in surrounding relation with said opening and expandable to a dimension greater than said opening to form a contoured profile intake in combination with such opening, means for retaining said envelope at its inner edge in adjacent relation with the edge of said opening, circumferentially expandable means disposed within said envelope and extendable to effect radially outward movement of said envelope, and relatively inextensible web means for limiting the outward movement of said circumferentially extendable means to define the finished contour of said envelope in its expanded position.

2. The device according to claim 1 wherein the envelope comprises an inner skin of extensible, resilient material within an outer skin of gastight fabric material.

3. The device according to claim 1 wherein the expandable means comprises at least one U-shaped inflatable tube.

4. The device according to claim 2 which is inflatable to form an intake for an aircraft engine comprising a plurality of U-shaped inflatable tubes disposed radially with respect to the intake with their limbs secured to opposite internal surfaces of an inflatable envelope, the limbs of each U-shaped tube being held together by an inextensible fabric web.

5. The device according to claim 4 wherein a series of resilient extensible cords are arranged between a rigid member surrounding the intake end of the engine and the radially outermost points of the envelope, the resilient cords being arranged so that they are stretched in the inflated state of the device and act to draw the envelope radially inwardly on deflation thereof.

6. The device according to claim 1 which is inflatable to form an intake for an aircraft engine wherein the expandable means comprises a series of expansible members arranged end-to-end in a continuous ring within the inflatable envelope, the expansible members being inflatable to increase the diameter of the ring to form a supporting structure for the inflated envelope.

7. The device according to claim 6 wherein the expansible members carry curved plates to support the envelope in the desired contour.

8. The inflatable device in accordance with claim 1 wherein said envelope and circumferentially expandable means are adapted to define upon inflation thereof a contoured intake of prescribed dimension which is reinforced against movement in its inflated condition and is adapted to flare outwardly from the intake opening surrounded by said inflatable device.

9. The device in accordance with claim 1 wherein said inflatable envelope is comprised of an inner skin of inextensible gastight fabric material and an outer skin of extensible resilient material which is stretched in the inflated condition of said device.

10. The structure in accordance with claim 1 including means for exhausting air from said device to effect its retraction radially inwardly to a deflated position in proximity with the opening surrounded by said inflatable device.

11. The device in accordance with claim 1 wherein said circumferentially expandable means comprises an annular inflatable tube which is adapted for diametral expansion upon inflation thereof.

12. The device in accordance with claim 11 wherein said inflatable tube is separately inflatable from the inflation of said envelope to be at a higher pressure than the pressure within said envelope.

13. The device in accordance with claim 12 wherein the ends of said tube are joined together to form a toroid within said envelope.

14. The device in accordance with claim 13 wherein said tube is of an elastomeric material having an outer lamination comprised of cords disposed in at least two directions forming equal and opposite bias angles with respect to the circumferential dimension of said toroid.

15. The device in accordance with claim 14 wherein said bias angles of such cords in the deflated state of said tube are greater than 54° 44′, whereupon inflation of said tube effects an increase in diameter of said toroid.

16. The device in accordance with claim 13 including a plurality of circumferentially disposed cords provided in surrounding relation with said toroid to limit radial expansion of said toroid upon inflation thereof.

17. The device in accordance with claim 16 including a plurality of fibers constructed in interwoven relation with said circumferentially extending cords to form a fixed position for said circumferentially disposed cords upon inflation of said toroid.

References Cited by the Examiner
UNITED STATES PATENTS

| | | | |
|---|---|---|---|
| 2,409,433 | 10/1946 | Hunter | 60—35.6 |
| 2,737,019 | 3/1956 | Billman | 60—35.6 |
| 3,074,232 | 1/1963 | Soyer | 60—35.6 |

MARK NEWMAN, *Primary Examiner.*

RALPH D. BLAKESLEE, *Examiner.*